United States Patent [19]
Buzzelli

[11] 3,977,901
[45] Aug. 31, 1976

[54] METAL/AIR CELLS AND IMPROVED AIR ELECTRODES FOR USE THEREIN

[75] Inventor: Edward S. Buzzelli, Export, Pa.
[73] Assignee: Westinghouse Electric Corporation, Pittsburgh, Pa.
[22] Filed: Oct. 23, 1974
[21] Appl. No.: 517,115

[52] U.S. Cl. .............................. 136/86 A; 136/86 D; 136/120 FC; 204/195 R
[51] Int. Cl.² ......................................... H01M 4/00
[58] Field of Search ............... 136/86 A, 86 D, 86 R, 136/120 FC; 204/195

[56] References Cited
UNITED STATES PATENTS

| | | | |
|---|---|---|---|
| 2,946,836 | 7/1960 | Justi et al. | 136/86 R |
| 3,380,856 | 4/1968 | Pohl | 136/120 FC |
| 3,527,616 | 9/1970 | Landi | 136/86 D |
| 3,684,579 | 8/1972 | Mund et al. | 136/120 FC |
| 3,793,085 | 2/1974 | Hino | 136/86 D |

Primary Examiner—John H. Mack
Assistant Examiner—H. A. Feeley
Attorney, Agent, or Firm—D. P. Cillo

[57] ABSTRACT

Air electrodes for use in electrochemical energy cells which comprise a hydrophilic layer and a hydrophobic layer laminated thereto. The hydrophilic layer essentially comprises a hydrophilic composite which includes
  i. an oxygen absorption/reduction carbon,
  ii. a material selected from the group consisting of
     a. $CuWO_4$, $NiWO_4$, $CoWO_4$ and WC with 1–20 wt. % Co. for a unifunctional electrode, or
     b. $WS_2$, WC, and WC with 1–20 Wt.% Co. for a bi-functional electrode, and
  iii. a nonwetting agent containing a polytetrafluoroethylene. A metal current collector is molded into the composite to form a substantially flat hydrophilic layer. A catalyst is preferably incorporated into the composite of a bifunctional electrode to increase cycling life. The hydrophobic layer, comprising a sheet of porous fluorinated ethylene propylene, polypropylene or polytetrafluoroethylene, is laminated to the hydrophilic layer to complete the air electrodes of the invention.

15 Claims, 11 Drawing Figures

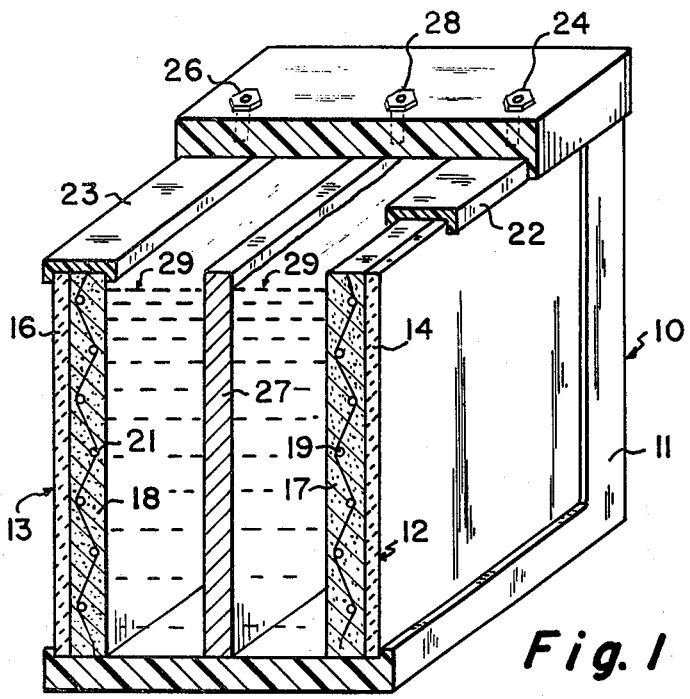
Fig. 1
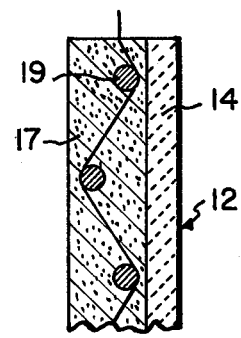
Fig. 2
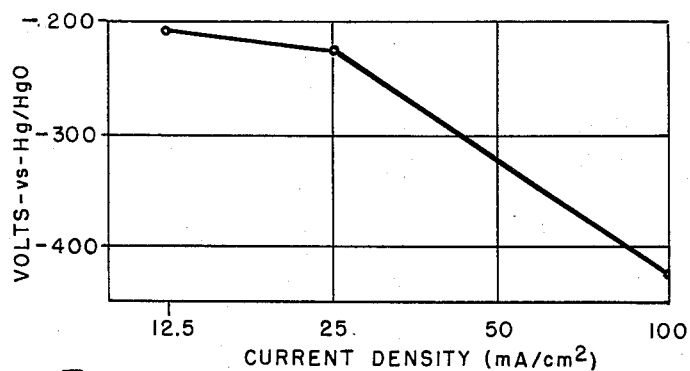
Fig. 3 POLARIZATION OF BIFUNCTIONAL
AIR ELECTRODE OF EXAMPLE 1
(half cell test)
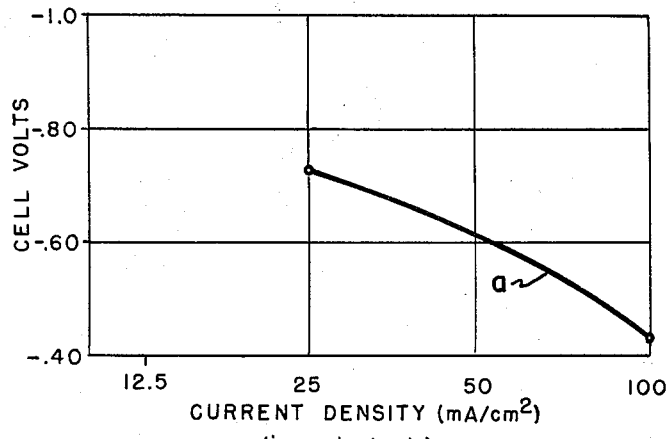
Fig. 4 POLARIZATION OF BIFUNCTIONAL IRON-AIR CELLS
(Curve a: air electrode of Example 1)

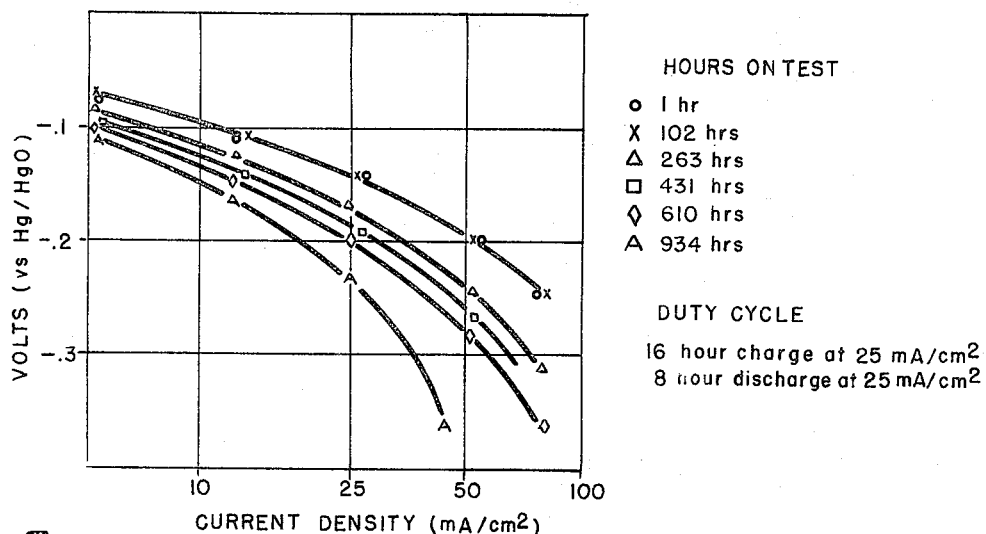

Fig. 5 POLARIZATION CHARACTERISTICS AS A FUNCTION OF TIME ON TEST FOR BIFUNCTIONAL AIR ELECTRODE OF EXAMPLE 2

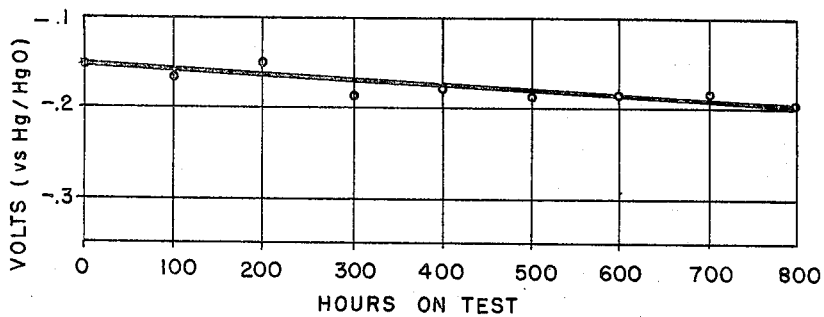

Fig. 6 LIFE CHARACTERISTICS OF BIFUNCTIONAL AIR ELECTRODE OF EXAMPLE 2 AT 25 mA/cm$^2$

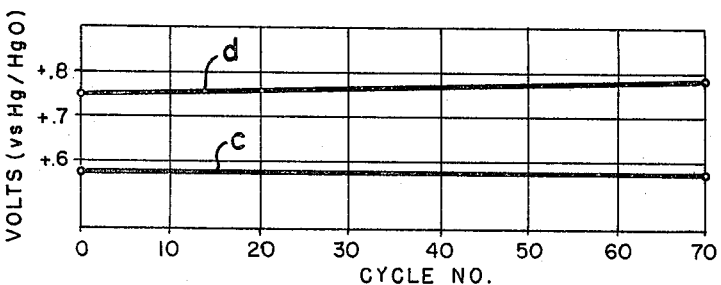

Fig. 7 CHARGING VOLTAGE OF BIFUNCTIONAL AIR ELECTRODES OF EXAMPLE 2 (Curve c) COMPARED TO ELECTRODE OF EXAMPLE 3 (Curve d)

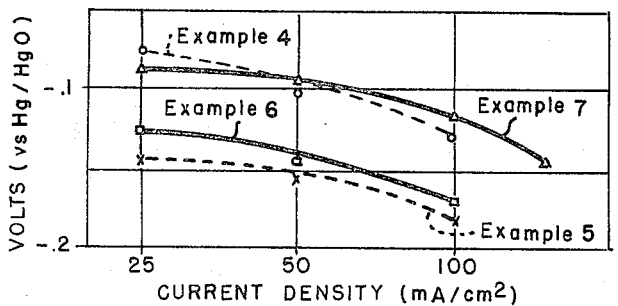

Fig. 8 POLARIZATION CHARACTERISTICS OF UNIFUNCTIONAL AIR ELECTRODES OF EXAMPLES 4 to 7

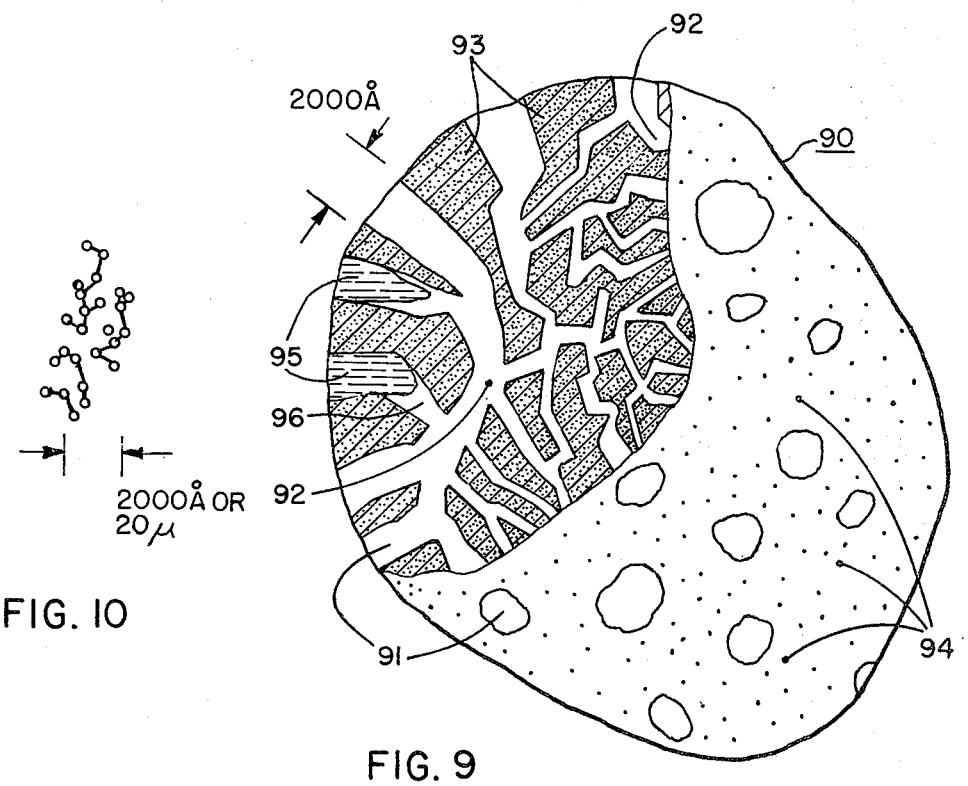
FIG. 10
FIG. 9
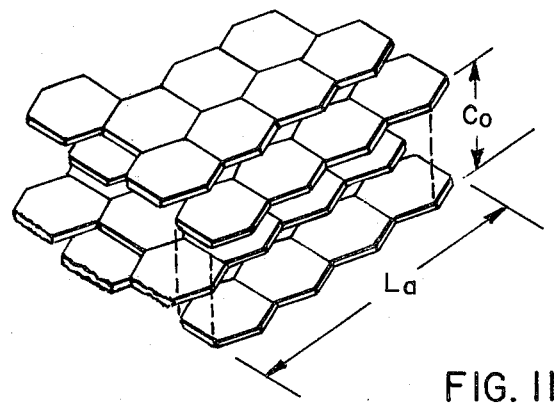
FIG. 11

METAL/AIR CELLS AND IMPROVED AIR ELECTRODES FOR USE THEREIN

FIELD OF THE INVENTION

The present invention relates to improved air electrodes for use in hydrogen/oxygen fuel cells and metal-/air cells and batteries.

BACKGROUND OF THE INVENTION

Air or oxygen depolarization cells are generally well known in the art. Electro-chemical cells of this type include a gas diffusion cathode capable of generating electricity by electro-chemically combining an oxidizable reactant with a reducible reactant. Generally, these electro-chemical cells are comprised of spaced apart electrodes ionically connected by an electrolyte. Illustrative of these cells and electrodes are U.S. Pat. Nos. 3,649,361, 3,553,024, 3,513,030, and 3,527,616.

Until recently, metal/air cells were not suitable for applications in which a rapid discharge was required. Presently, however, metal/air cells are capable of achieving high energy to density ratios making them useful in rapid discharge applications such as light weight intraurban vehicles.

The air electrodes utilized in present state-of-the-art metal/air cells, however, are unifunctional; that is, they are incapable of electro-chemically regenerating the fuel electrode. Therefore, in order to recharge the battery a third, counter-electrode is required. Since the counter-electrode is used only during the recharging cycle and the air electrode only during discharge, the cell requires a complicated geometric design as well as complex mechanical or electrical switching means. Additionally, the use of a counter-electrode increases the dead weight of the cell thereby reducing the watt-hr./lb. energy storage capacity. In addition to those disadvantages, it has been found that the presence of the counter-electrode reduces the cell voltage, resulting in a deterioration of the capacity of the metal electrode on extended cycling, and provides high internal resistance.

Notwithstanding the disadvantages of metal/air cells having unifunctional air electrodes, these cells are extremely useful in applications where recharging is not required. Many applications require low cost metal/air batteries of the "throw-away" type or in replaceable anode cells.

Accordingly, it is an object of the present invention to provide a bifunctional air electrode for use in metal-/air cells that undergo substantion charge-discharge cycling. It is a further object of the invention to provide a bifunctional air electrode which not only eliminates the need for a counter-elelctrode, but which has a long cycling life, stability, and high energy capacity. Another object of the invention is to provide a low cost air electrode having improved operating characteristics for use in metal/air cells, particularly iron/air cells and for use in hydrogen/oxygen fuel cells.

SUMMARY OF THE INVENTION

The present invention is directed to a novel bifunctional electrolyte electrode for use in metal/air battery systems. Generally, the bifunctional air electrode of the present invention includes a hydrophilic layer comprising an expanded metal, wire screen or metal fibrous mesh current collector inert to electrolyte and preferably fabricated from nickel, or nickel plated steel wire, integrally molded into a hydrophilic composite material. The hydrophilic layer is then laminated with a hydrophobic layer. The laminated composite air electrode is then suitably framed in a material that is corrosion resistant to the alkaline electroyte such as an ABS plastic. The air electrode is positioned within the cell so that the hydrophobic material is in contact with either air or oxygen, and the hydrophilic material is in contact with an alkalihydroxide electrolyte such as NaOH, KOH or LiOH.

Preferably, the hydrophilic layer of the air electrode is fabricated from a composite into which the current collector is press molded. The hydrophilic composite for the bifunctional electrode into which the current collector is molded comprises three components, and, preferably, four. The composite for the bifunctional electrode includes, as a first component an oxygen absorption and reduction material such as carbon blacks having a low surface area with a probable value of between about 30–600 sq. meters/gram, and consisting of generally discrete particles having a size between about 0.005–0.13 microns diameter. The second component utilized in the hydrophilic composite for the bifunctional electrode provides a low oxygen overvoltage, that is decreases oxygen overvoltage, and also is believed to aid in reducing oxygen reduction products as well as acting as a catalyst for the decomposition of perhydroxide. Compounds found suitable for use as the second component include tungsten disulfide, tungsten carbide, and tungsten carbide containing about 1–20 but preferably 10–15 wt.% fused cobalt. In this material the cobalt is generally fuse sintered onto tungsten carbide particles. The third component is a nonwetting agent to prevent gross flooding of the electrode by the electrolyte and preferably comprises a blend of fibrillated polytetrafluoroethylene and particulate fluorinated ethylene propylene, the combination of particle configurations giving the best results. Preferably, a fourth component is added which has been found to signficantly increase the performance level of the completed electrode. The fourth component is a catalyst, such as silver, platinum or silver-mercury, but preferably silver, which is effective for the reduction of oxygen and the decomposition of intermediate reaction products, typically perhydroxides.

These four components for the hydrophilic composite for the bifunctional electrode are mixed together in a ratio of about 1 part by weight carbon, 0–1.5 parts but preferably 0.5–1.5 parts by weight catalyst, 0.5–4 parts by weight WC, $WS_2$ or WC with 1–20 wt.% Co., and an amount of of nonwetting agent effective to bond the other components together and prevent electrolyte flooding, usually about 0.15–3 parts by weight nonwetting agent as a powder having a preferred particulate size range of 0.2 to 40 microns. To this mixture a sufficient amount of deionized water is added to form a paste-like consistency. This paste is then spread over and pressed into the fibrous mesh current collector, to integrate the current collector into a composite structure. The structure is then air dried and pressed to form the hydrophilic layer. The hydrophilic layer is then laminated with a layer of hydrophobic material impervious to the electrolyte, but capable of permitting air and oxygen diffusion therethrough. Preferably, the gas permeable, alkaline liquid impermeable hydrophobic layer comprises a combination sheet of porous polytetrafluoroethylene, polypropylene and fluorinated ethylene propylene fibers.

The bifunctional metal/air battery of the present invention comprises at least one bifunctional air electrode as described above having the hydrophobic layer in contact with a source of oxygen or air, such as the atmosphere. A metal (fuel) electrode made of iron, cadmium, zinc or the like is spaced apart from the air electrode and ionically connected by an alkali hydroxide electrolyte, preferably KOH. The metal/air battery system of the present invention provides higher energy/power requirement than previous metal/air systems, e.g., about 50 to 60 watt-hours/pound at 10–30 watts per pound. Moreover, the bifunctional air/metal battery of the present invention is capable of substantially improved cycle life (charge-discharge cycles). In the charging cycle for the bifunctional electrodes of this invention, the air electrodes can be maintained at a potential of approximately 0.50–0.75 volts above a Hg/HgO reference electrode. The advantages of this low charging voltage are increased stability due to the low oxygen evolution voltage as well as improved energy efficiency for the cell or battery.

In another embodiment of the present invention, a low cost unifunctional air electrode is provided. The unifunctional air electrode of the present invention eliminates the need for a noble metal catalyst as required in state-of-the-art unifunctional air electrodes. Thus, by eliminating the need for expensive catalysts such as Ag or Ag-Hg, a low cost air electrode and battery system is practical. The unifunctional electrode can also be used with a wide range of "activated" carbon and with both fluffy and pellet type unactivated carbons.

Generally, the unifunctional air electrode of the present invention comprises a hydrophilic layer having a three component hydrophilic composition with a fibrous mesh current collector integrally molded therein. As a first component an oxygen absorbent and reduction material is used. This is a carbon black or "activated carbon" generally having a greater particle size and greater surface area with less crystallinity than the aforedescribed carbon that must be utilized in the bifunctional air electrode. The second component comprises a material selected from the group consisting of copper tungstate, nickel tungstate, cobalt tungstate, and tungsten carbide with about 1–20 but preferably 10–15 wt.% fused cobalt. The third component is a nonwetting agent to prevent gross flooding of the electrode and consists of polytetrafluoroethylene and fluorinated ethylene propylene.

These three components for the hydrophilic composite for the unifunctional electrode are mixed together as powders to provide a composition comprising about 1 part by weight carbon, 0.5–4 parts by weight WC with 1–20 wt.% fused Co, $CoWO_4$, $NiWO_4$, or $CuWO_4$, and an amount of nonwetting agent effective to bond the other components together and prevent electrolyte flooding, usually about 0.15–3 parts by weight nonwetting agent as a powder having a particulate size range of 0.2 to 40 microns. The mixed components are then formed in a paste by the addition of deionized water and spread over the current collector as set forth above.

While the air electrode of this unifunctional embodiment is capable of a couple of recharge cycles, its stability as a bifunctional battery is limited and, therefore, it is useful primarily as a unifunctional cathode in a metal/air battery system. Since the air electrode of the present invention is relatively inexpensive because of the elimination of the catalyst, it is useful in disposable primary battery systems, or in replaceable anode systems, where high performance levels at high drain rates are more important than extended life.

Other advantages of the present invention will become apparent from a perusal of the following detailed description of the presently preferred embodiments of the invention taken in connection with the accompanying drawings.

BRIEF DESCRIPTION OF THE DRAWINGS

FIG. 1 is an isometric view in partial section of an air/metal battery of the present invention;

FIG. 2 is an enlarged sectional elevation of the air cathode of the present invention;

FIG. 3 is a graphical representation of the polarization of a bifunctional air electrode of the present invention;

FIG. 4 is a graphical representation of the polarization of one of the bifunctional iron-air cells of the present invention;

FIG. 5 is a graphical representation of the polarization characteristics as a function of time of the bifunctional air electrode of Example 2;

FIG. 6 is a graphical representation of the life characteristics of the bifunctional air electrode of Example 2;

FIG. 7 is comparative charging voltage graph of the electrodes of Examples 2 and 3;

FIG. 8 is a graphical representation of the polarization characteristics of the low cost unifunctional air electrode of Examples 4–7;

FIG. 9 is an idealized three dimensional cross section of a type activated carbon;

FIG. 10 is an enlarged view of fluffy type acetylene black carbon; and

FIG. 11 is a three dimensional representation of the crystallite structure of graphite molecules.

PRESENTLY PREFERRED EMBODIMENTS

With reference to FIG. 1, battery 10 is a general representation of the bifunctional and unifunctional metal/air cells of the present invention. Metal/air cell 10 includes a casing 11 for support of the air electrode and fuel electrode as well as the electrolyte. Preferably, casing 11 is fabricated from ABS plastic or other nonconducting material that is stable or resistant to the electrolyte and reaction products, typically oxygen and hydrogen. Cell 10 comprises a pair of air cathodes 12 and 13 each having an outer hydrophobic layer 14 and 16, respectively, each of which is in contact with the atmosphere or other source of air or oxygen. Air electrodes 12 and 13 also include hydrophilic layers 17 and 18, respectively, including integrally molded metal current collectors 19 and 21. Electrodes 12 and 13 are framed in frames 22 and 23, preferably made from ABS plastic and having electrical leads 24 and 26, respectively.

Metal/air cell 10 includes a fuel electrode 27, preferably fabricated from iron, cadmium, zinc or the like material, preferably iron spaced between air electrodes 12 and 13 and including electrical lead 28. Metal/air cell 10 also includes an electrolyte 29 between and in contact with metal electrode 27 and air electrodes 12 and 13, respectively. Electrolyte 29 is an alkali hydroxide, preferably potassium hydroxide.

With reference to FIG. 2, the component materials will be described primarily with references to the bifunctional electrode. The ranges of components have been described in the Summary for both bifunctional and unifunctional electrodes. Air cathode 12 is shown with hydrophilic layer 17 and hydrophobic layer 14 laminated thereto. Current collector 19 is integrally molded into hydrophilic layer 17 an is adapted for electrical connection to the circuit. In the present invention, the hydrophilic layer is about 5 to 100 mils and preferably about 10–45 mils in thickness and the hydrophobic layer is about 5 to 20 mils. Generally, it has been found that the life of an air electrodes increase with an increase in the thickness of the hydrophilic layer. However, any increase greater than about 100 mils is undesirable because of the increase in weight to the cell.

Hydrophilic layers 17 and 18 comprise a composite of preferably four components and an integral current collector. This hydrophilic composite when used in a bifunctional electrode must include a low surface area oxygen absorption and reduction material such as carbon black. Preferably, the carbon is in a fluffy form comprising discrete particles in a chain like form such as Shawinigan acetylene black, having a low surface area of about 30 to 300 square meters per gram, as described in U.S. Pat. No. 2,453,440 herein incorporated by reference; or may comprise a mixture of low surface area acetylene black carbon, and channel carbon black preferably in a fluffy form comprising discrete particles, having a surface area of about 80 to 600 square meters per gram.

It had been previously believed by those familiar with air electrode art that high-surface area carbon (about 1200 sq. meters/gram) with excellent per oxide decomposition properties would give best electrode performance; however, I have found that only certain type carbons will work in the hydrophilic layer of the bifunctional electrode of this invention. The carbon acts as a surface to evolve oxygen during changing, according to the reaction $4OH^- \rightarrow O_2 + 2H_2O + 4e^-$. I found that unactivated fluffy type acetylene black carbon, having a surface area of about 70 sq. meters/gram, and a particle size diameter range between about 0.005 – 0.13 microns, was highly effective, at about a 0.6 volt potential during charging, with WC low oxygen overvoltage material containing 12 weight percent Co. This combination envolved oxygen without deleterious effects on the electrode. Carbons activated to the extent of having surface areas of over about 600 sq. meters/gram, and particularly activated carbons in the 750–1300 sq. meters/gram range also evolved oxygen, but the carbon was apparently structurally destroyed and the electrode became water permeable. The reason for this is not completely understood at this time.

One type carbon found to be extremely useful in the bifunctional electrode is produced by the thermal decomposition of acetylene at temperatures of about 800°C. Acetylene gas is passed through a cooled inlet pipe downwards into a refractory-lined retort which is first heated to the required dissociation temperature by burning the acetylene as it is introduced. Once this temperature is reached, burning is discontinued and the acetylene is allowed to continue to flow into the retort in the absence of air, or mixed with small amounts of air. Decomposition of the acetylene (HC ≡ CH) occurs, and flakes of flocculent, fluffy carbon black appear at the base of the retort, where the hydrogen may be burned with air admitted there or may be separated from the black without combustion. The separated acetylene black is conveyed to presses where it is compressed to varying degrees for shipment. The principle commercially available acetylene black is the thermal process product well known in the industry as Shawinigan black.

This useful acetylene black, produced by the continuous thermal decomposition of acetylene has no external crystal form but shows some crystalline structure internally. It is more nearly crystalline than activated carbons and most channel carbon blacks. Graphitic layers are stacked together at equidistant intervals slightly greater than in graphite, but the layers are random in translation and rotation with respect to each other.

Detailed investigation shows particles joined together in a chain-like fashion, by carbon-oxygen complexes in a three dimensional fishnet structure. Acetylene black contains about 99.3% carbon, 0.04% moisture, 0.6% volatiles, 0.15% $O_2$, 0.02% ether extract and 0.04% ash. It has a particle size range distribution of between about 0.005–0.13 microns diameter (50–1300A) with a mean particle size of about 0.04 microns.

Acetylene black has a surface area of between about 30 to 300 square meters/gram. By surface area is meant the total external and internal area/gram. The porous nature of carbon excludes surface area measurement by microscopial examination, which would give only the external surface. Consequently, indirect methods are used, which include measurements based either on absorption isotherms or on thermal effects. Generally the carbon is blanketed with a known quantity of absorbed gas, such as $N_2$. In the method of of Brunauer, Emmett and Teller (BET), which is the standard method of measuring the internal surface area, an absorption isotherm is plotted to yield a straight line in which the slope and intercept give the amount of $N_2$ gas required to form a monolayer on all the carbon external and internal surface. Knowing the probable area occupied by each molecule of $N_2$ the probable area of the absorbent can be calculated.

Acetylene black has a low resistivity of between about 0.035 – 0.22 ohms/cu. in. at 2500 psi, with the preferred Shawinigan acetylene black having a resistivity of about 0.035 – 0.05 ohm/cu. in., making these type carbons excellent electron conductors. Acetylene black has a density of about 1.20 lb/cu. foot in its fluffy particulate form and each particle contains few pore openings greater than 0.002 microns on its external surface. Almost all of its surface area is external, there being relatively few internal channels as compared to "activated" carbons.

Other useful low surface area carbon black materials which could be used alone, but preferably mixed with the preferred acetylene black described above, include fluffy type channel carbon black of the type that is the product of the incomplete combustion of natural gas. This carbon is generally deposited by contact of a flame on a metalluc surface. Channel carbon black contains about 84–97% carbon, 5–14% moisture, 0.01–0.1% ash and 3–10% $O_2$. It has a particle size between about 0.005–0.13 microns diameter as formed (50–1300A) with a mean particle size of about 0.03 microns. The surface area of suitable channel carbon blacks are between about 80 to 600 square meters per gram. The particles are generally joined together in a chain-like fashion by carbon-oxygen complexes and should be employed in the bifunctional electrode in fluffy form.

By agitation of channel carbon black with water to form a slurry, small pellets, each containing up to 100,000,000,000 discrete carbon particles are made without the use of binders. While the fluffy particulate materials are preferred and should be employed in the bifunctional electrode, the pellets are easy to handle and can be broken up to suitable size in a ball mill or other type grinding means for use in unifunctional electrodes. When ground up pellets of channel carbon black are used in the bifunctional electrodes they seem to act similarly to "activated" carbons because of their high internal pore area.

Channel carbon black has a low resistivity of between about 0.36 ohm/cu. in. at 2500 psi, making it an excellent electrical conductor, a density somewhat similar to acetylene black and little significant porosity on its external surface. Channel carbon black is mainly crystalline with some amorphous particles blended in with it. A detailed description may be found of both channel carbon black and acetylene black in *Industrial Carbon*, C. L. Mantell, 1946, chapters IV and VI, herein incorporated by reference.

Materials that are not suitable for use in the bifunctional electrodes of this invention, although they find use in the unifunctional electrode, are the "activated" carbon materials. These are solid carbon foams of extremly high total internal and external surface area. The "activated" carbon materials are made by heating previously charred carbonaceous substances (wood charcoal, bone char, peat) to a high temperature in the presence of steam, or by chemically reacting them with a dehydrating agent at an elevated temperature after which the dehydrating agent is leached out. These materials contain about 84–91% carbon, 8–14% moisture and 1–10% ash. They may have a particle size of between about 0.005–50 microns diameter (50–500,000A) but generally between about 30–50 microns. The surface area of "activated" carbons are usually substantially over 600 sq. meters/gram with average values of 1400–1600 sq. meters/gram i.e. one pound of this type carbon would have as much surface area as a 125 acre farm. Almost all of its surface area is internal.

The vast surface are of "activated" carbons is created during the activation step in the manufacturing process. Generally these type of materials are used for absorption processes. The "activated" carbon granules are permeated with a complex internal network of submicroscopic channels or pores. When a gas or liquid contacts the "activated" carbon granules, the molecules which make up the gas or liquid enter into the granules through macropores with openings about 0.002 to 10 microns (20–100,000A), generally 500–10,000A or larger. From there, the molecules migrate into the porous internal matrix. The attractive forces which emanate from the carbon surface layer molecules of the micropore walls overcome the kinetic energy of the passing gas or liquid molecules, and those molecules are drawn to the wall surface where they are physically trapped.

With reference again to FIG. 2, in the air cathode 12 shown, the air penetrates by diffusion to a three phase zone which is a narrow electrochemically active zone where the $O_2$, liquid electrolyte and solid carbon particles meet. A catalyst may also be present. The most effective interface is at the current collector 19. Although the process is not completely understood, it is believed that activated carbons are oxidized, flooded, and physically degraded in the bifunctional electrode during the charging reaction, causing the carbon to become very hydrophilic, and forcing the electrochemically active zone to move dramatically toward the air source; whereas the non-activated, lower surface area carbon blacks are effected to a much lesser extent.

Referring now to FIG. 9, the structure of one type "activated" carbon is shown as 90. Pore entrances 91, about 1500A diameter are shown, as well as the internal pore structure 92 having channels, about 750A diameter, within the carbon matrix 93. It is theorized, that during charging, the oxygen formed by the reaction $4OH^- \rightarrow O_2 + 2H_2O + 4e^-$ may begin to form at a variety of points 92, within the matrix of carbon, as well as on the carbon surface, as for example at points 94. As a result, the carbon particle may, in some instances "explode", due to the force of the oxygen forming within its channel matrix. This may in part then cause electrolyte flooding.

Also, during the charging reaction, carbon-oxygen complex surface groups form. The more of these attached hydrophilic groups on the accessible surface of the generally hydrophobic carbon, the more prone the electrode may be to electrolyte flooding. It is believed that the small outside area, relative to the internal area, of the "activated" carbons make them excessively prone to oxidation and carbon wetting and flooding and allows a greater proporation of attached groups to form per volume than small diameter carbon blacks. These attached groups allow electrolyte, as shown as 95 in FIG. 9, to penetrate deeply into the carbon structure, as at 96. During oxygen reduction according to the reactions:

$$O_2 + H_2O + 2e^- \rightarrow HO_2^- + OH^-;$$

$$HO_2^- \rightarrow 1/2O_2 + OH^- \text{ or}$$

$$2e^- + H_2O + HO_2 \rightarrow 3OH^-,$$

the $O_2$ from the air cannot easily permeate the carbon structure causing irreversible electrode damage. Overall, for some reason, because of theorized $O_2$ "explosions" or carbon oxidation during peroxide decompositon, the active interface of electrochemical reaction is shifted dramatically to the edge of the air cathodeair interface, causing increased electrical resistance in the bifunctional electrode and the battery when "activated" carbon is used.

In contrast, FIG. 10 shows the preferred fluffy type acetylene black structure used in the bifunctional electrode. As can be seen, the material consists of minute, substantially non porous, generally spherical separate particles with high external surface area. They are joined together in a three dimensional chain-like fashion by carbon-oxygen complexes which provide links between substantially discrete carbon particles. The material should be employed in the bifunctional electrode in fluffy form, where the particles are separated from each other as distinguished from pellet form. Microscopic examination shows this black to be made up of substantially lace-like, needle shaped networks joining separated individual or small aggregates of particles of carbon. This is very unlike pellet type blacks, where millions of particles are in intimate contact forming very high interior surface areas between the particles.

This material also has a highly graphtic structure. Graphite has an interlayer spacing of 3.35A or a value $C_o$ (twice the perpendicular distance between layers) as measured by X-ray diffraction, of 6.70A, whereas "amorphous" carbon has a value $C_o$ of over about 7.0A. FIG. 11 shows the crystallite structure for graphite molecules, which have a dimension La in the direction of the layer of about 1000A.

Channel blacks have a crystallographically measured range of $C_o$ of 7.12–7.2A and a value La of about 14–17A. Acetylene black has a crystallographically measured range $C_o$ of 7.05–7.2A and a value La of 30–34A. "Activated" carbons are not as graphitized, having $C_o$ values ranging from about 7.2–7.7A and La values of from about 27–38A.

The useful conducting carbon black material, which will provide suitable commercial bifunctional electrodes must have the following properties: it must not be highly activated carbon i.e. its total probable external and internal surface area must be below about 600 square meters per gram, preferably 30 to 450 sq. meters/gram with a most preferred probable value of 30 to 300 sq. meters/gram for acetylene black, and its external surface must have a little significant porosity above 0.002 micron (20A) pore entrances, any pores present on the particles being between about 0.0005–0.002 microns; its crystalline structure would preferably be highly graphitized, having an interlayer spacing $C_o$ in its preferred form of up to 7.2A generally between 7.0 to 7.2A; its particle size must be between about 0.005–0.13 microns diameter and it must preferably be a low ash (below about 0.1% ash) carbon as formed in the process of the thermal oxidation of a gas containing carbon. Generally above 0.13 microns diameter in the carbon will reduce electron flow and cause resistivity problems in the electrode. The most useful conducting carbon material will be in fluffy, non-pelletized, discrete particle form and will have each particle of ultramicroscopic carbon surrounded by a carbon oxygen complex which acts as a link in a carbon chain network.

The second component is utilized in the hydrophilic composite to decrease the oxygen overvoltage. It is also believed to aid in reducing oxygen reduction products as well as functioning as a catalyst for the decomposition of perhydroxide. Compounds found suitable for use as the second component in the bifunctional electrode include tungsten disulfide, and preferably tungsten carbide, and tungsten carbide with from about 1–20 wt.% fused cobalt.

The third component is a non-wetting fluorocarbon agent that prevents gross flooding of the electrode by the electrolyte. This component also acts as a bonding agent for the composite and preferably comprises a blend of polytetrafluoroethylene and fluorinted ethylene propylene.

It is preferred that a fourth component be incorporated into the hydrophilic composition which functions in the bifunctional electrode, as a catalyst effective for the reduction of oxygen, and, most importantly, for the catalytic decomposition of perhydroxides which build up in the electrode during discharge. It has been found that by incorporating an effective amount of a suitable catalyst, such as a silver, platinum or silver-mercury alloy catalyst into the hydrophilic composition, a significant improvement in performance is obtained. While the bifunctional air electrode performs without the catalyst, it has a cycle life of only about 20 to 50 charge-discharge cycles. This component is not necessary in the hydrophilic composite in the unifunctional electrode.

The components are mixed together with deionized water to a paste-like consistency. The composition is then spread over and through electronic current collectors 19 and 21, each preferably formed as an array of 1 mil nickel or nickel plated steel fibers sintered together generally below the melting point of the fibers to form a plaque with a theoretical density of about 5–15% i.e. about 85–95% porous at a thickness of 12–45 mils. The compositin is permitted to air dry and thereafter is subjected to a flat-bed pressing at a temperature between 250° and 300°C at a pressure of between 0.25 and 3 tons/in$^2$.

The pressing operating effects the quality of the air electrode and it is therefore preferred that the temperature and pressure be adhered to for the best results. The resulting hydrophilic layer has a preferred thickness of from 10 to 45 mils. The pressing step thermally reduces the catalyst, preferably incorporated as $AgNO_3$, to the metal species, silver, and increases the overall electrical conductivity of the sintered plaque by compaction.

Hydrophobic layers 14 and 16 can comprise a sheet of porous, unsintered, completely fibrillated polytetrafluoroethylene alone or in combination with polymethylmethacrylate and plasticizers such as dialkyl phthalate as set forth in U.S. Pat. Nos. 3,407,249, 3,527,616 and 3,679,614 incorporated herein by reference. Preferably the hydrophobic layers will comprise a sheet of porous unfibrillated fluorinated ethylene propylene and fibrillated polytetrafluoroethylene and polypropylene fibers. While other methods of attaching hydrophobic layers 14 and 16 to hydrophilic layers 17 and 18 are suitable, it is preferred that they be roll laminated. Both layers are passed through a two mill wherein the roll surfaces are maintained at a temperature of about 190°C with a pressure therebetween of about 25 psi.

The following nonlimiting examples are illustrative of various air electrodes and metal/air batteries formed therewith utilizing the preferred hydrophilic materials set forth above.

EXAMPLE 1

A bifunctional air electrode was fabricated utilizing tungsten disulfide as the third component of the hydrophilic composite and not containing any silver catalyst. In this example, one gram of a fluffy acetylene black carbon sold by Shawinigan Products Corp. consisting primarily of substantially discrete connected particles having a particle size diameter between about 0.02–0.1 microns and having a surface area of 60–70 sq. meters/gram, 3 grams of tungsten disulfide, and 30 drops, 0.75 grams of Teflon 30B polytetrafluoroethylene nonwetting binding agent were admixed. These powders were thoroughly mixed with water to a consistency useful for hand pasting. The paste was then spread into as well as over both sides of a 75 cm$^2$ sintered nickel mesh plaque current collector (0.045 inches, 6% theoretical density) to form the hydrophilic composite. This plaque was then air dried to remove the moisture. The composite plaque was then molded by flat-bed pressing at 275°C for 10 minutes at 18 tons to form the hydrophilic layer having thickness of about 0.012 inch. The hydrophilic layer was then air dried in preparation for roll lamination thereon of the hydrophobic layer. The hydrophilic layer was then roll laminated with a hydrophobic sheet of fibrillated polytetrafuoroethylene as set forth above and the resulting bifunctional air electrode was framed in ABS plastic for use in a test cell.

With reference to FIG. 3, the air electrode of Example 1 was operated as a half cell against a nickel couterelectrode. It was then charged (oxygen evolution on air electrode) against the nickel counter-electrode several times at various current with no deterioration in performance. With reference to FIG. 4, Curve a, the polarization of the air electrode of Example 1 in an iron-air cell is shown. This cell was fabricated out of two bifunctional air electrodes of Example 1, and a preformed iron (fuel) electrode as provided in FIG. 1. The discharge of the cell containing two tungsten disulfide bifunctional air electrodes resulted in a projected battery having 40 to 60 watt-hour per pound.

For example, the iron-air cell shown in FIG. 1 utilizing air electrodes of Example 1, was charged at various currents (one-half to one amp.) for 16 hours with a constant current power supply. The air electrodes were at the low potential of approximately 0.600 volts above Hg/HgO for the entire charging cycle. There was no deterioration to the air electrode after about 20 charge-discharge cycles. This system provided a minimum lifetime system. Much improved results are to be expected with the preferred WC and WC with 1–20 wt.% Co additives as the low oxygen overvoltage material and with a silver type catalyst. The starting cell voltage at ½ amp. discharge rate was about 770 mV, corresponding to an iron-electrode voltage of about 950 mV below Hg/HgO, with air electrodes at about 180 mV below Hg/HgO. The current density on the iron-electrode was about 12.5 milliamps per $cm^2$ of iron electrode at 1 amp. (25 $mA/cm^2$). The iron-air cell voltage was about 700 millivolts. All polarization is shown in FIG. 4.

EXAMPLE 2

A bifunctional air electrode was prepared utilizing 1 gram (1 part by weight) of tungsten carbide - 12% by weight fused Co. as the second component, 1 gram (1 part by weight) fluffy acetylene black carbon (Shawinigan sold by Shawinigan Products Corp.) consisting primarily of substantially discrete connected particles having a particle size diameter between about 0.02–0.1 microns and having a surface area of 60–70 sq. meters/gram, 1 gram (1 part by weight) $AgNo_3$, or 0.65 part as silver catalyst, 1 gram (1 part by weight Teflon 30B polytetrafluoroethylene and 1.2 grams (1.2 parts by weight) fluorinated ethylene propylene. The four components were mixed together with 15 cc. of deionized water to provide a pastable consistency. A 75 $cm^2$ sintered nickel mesh current collector (0.45 inch, 6% theoretical density) was integrated into the paste-like composition and permitted to dry. It was then flat-bed pressed for compaction at 275°C, for 10 minutes at 18 tons. The resultant hydrophilic layer was air dried and roll laminated as set forth above with a hydrophobic layer of porous, unsintered, fibrillated polytetrafluoroethylene. The electrode was then framed for testing as either a half cell or full cell in combination with an iron (fuel) electrode.

The polarization characteristics as functions of time for air electrode of Example 2 are shown in FIG. 5. The polarization curves of FIG. 5 for the air electrode of Example 2 had a duty cycle of an 16-hour charge at 25 $mA/cm^2$ followed by an 8-hour discharge at 25 $mA/cm^2$. The air electrode of Example 2 showed relatively stable performance during the first 750 hours of testing; approximately 50 millivolt deterioration at 25 milliamps per $cm^2$. The life curve for the polarization of electrode of Example 2 at 25 milliamps per $cm^2$ is shown in FIG. 6. FIG. 7 Curve c, shows the excellent low voltage stability of this bifunctional electrode after 70 cycles at about 0.58 volts.

EXAMPLE 3

As a comparative example an air electrode was prepared as in Example 2 except that the tungsten carbide - 12 weight % cobalt was not included in the hydrophilic layer i.e. no low oxygen overvoltage material was included in the hydrophilic layer. With reference to FIG. 7, a comparison of the charging voltages of the bifunctional air electrodes of Examples 2, Curve c, and the air electrode of Example 3. Curve d, is shown. As can be clearly seen from FIG. 7, a very substantial improvement in lower charging voltage is attained by utilizing tungsten carbide - 12 wt.% cobalt in the hydrophilic layer of a bifunctional electrode i.e about 0.58 for the bifunctional electrode of Example 2 vs. about 0.78 for the electrode of Example 3. The duty cycle of the comparative test comprised a 1 hour charge at 25 $mA/cm^2$ and ¼ hour discharge at 25 $mA/cm^2$. The bifunctional air electrodes of Example 2 have been cycled for over 100 charge discharge cycles without deterioration or flooding, indicating excellent stability.

UNIFUNCTIONAL AIR ELECTRODE AND METAL/AIR BATTERIES

EXAMPLES 4–7

The unifunctional air electrodes of the present invention were fabricated in a manner similar to those of Examples 1 and 2, with exception that the hydrophilic composite comprised a three-component system. Pursuant to the present invention, the optional component, the silver catalyst, was completely eliminated.

Accordingly, the hydrophilic composite comprised 2 g. of fluffy acetylene black carbon Shawinigan 16 drops 0.38 grams of Teflon 30B polytetrafluoroethylene, and 2 g.:

Copper Tungstate - Ex. 4,
Nickel Tungstate - Ex. 5,
Cobalt Tungstate - Ex. 6, or
Tungsten Carbide - 12% by weight Co. - Ex. 7.

These components were mixed with deionized water into a paste for the integral molding of the nickel current collector as set forth in Example 1. The porous, unsintered, completely fibrillated polytetrafluoroethylene hydropholic layer was laminated on the hydrophilic layer in the manner described above.

The electrodes of Examples 4–7 were tested, and the results shown in FIG. 8. As can be seen from FIG. 8, the air 8, the air electrode of Example 7, WC-12 wt.% Co, and Example 6, $CuWo_4$, were the best.

All of the electrodes were tried as bifunctional air electrodes for use in metal/air systems. It was found that they were not capable of sustaining the desired oxygen reduction properties after about 7 charge cycles. Accordingly, their primary use is in low cost unifunctional systems.

While presently preferred embodiments of the invention have been shown and described in particularity, it may otherwise be embodied within the scope of the appended claims.

I claim:

1. An air electrode for use in electrochemical energy cells comprising:
   A. a hydrophilic layer consisting essentially of
      1. a hydrophilic composite comprising i. about 1 part by weight of oxygen absorption/reduction carbon particles having a total surface area of from about 30 to about 600 sq. meters/gram;

ii. about 0.5–4 parts by weight of a low oxygen overvoltage material selected from the group consisting of $CuWO_4$, $NiWO_4$, $CoWO_4$, $WS_2$, WC and WC fuse sinter coated with 1–20 wt.% Co and mixtures thereof;

iii. an effective amount of a bonding/nonwetting agent including at least polytetrafluoroethylene; and iv. an effective amount of a catalyst for oxygen reduction and decomposition of perhydroxides selected from the group consisting of silver, platinum and silver mercury alloy; and 2. a metal current collector molded into said composite to form a hydrophilic layer; and B. a hydrophobic layer laminated to said hydrophilic layer.

2. An electrode as set forth in claim 1 wherein iv. the current collector is a metal fiber current collector.

3. An electrode as set forth in claim 1 wherein said hydrophobic layer conprises a sheet of porous, plastic selected from the group consisting of polytetrafluoroethylene, polypropylene, fluorinated ethylene propylene and mixtures thereof and the low oxygen overvoltage material is selected from the group consisting of $WS_2$, WC and WC fuse sinter coated with 1–20 wt.% Co.

4. An electrode as set forth in claim 1 wherein said hydrophilic composite is substantially flat and the catalyst is silver.

5. A metal/air cell comprising a metal electrode selected from the group consisting of iron, zinc, and cadmium; at least one air electrode as set forth in claim 1 spaced apart from said metal electrode; and an alkali hydroxide electrolyte in contact with said metal and air electrode.

6. An air electrode for use in electrochemical energy cells capable of non destructive charging comprising:

A. a hydrophilic layer consisting essentially of 1. a hydrophilic composite comprising i. about 1 part by weight of substantially discrete oxygen absorption/reduction carbon black particles having a particle size range of between about 0.005–0.13 microns and a total probable surface area of from about 30–600 sq. meters/gram.;

ii. about 0.5–4 parts by weight of low oxygen over voltage material selected from the group consisting of $CuWO_4$, $NiWO_4$, $CoWO_4$, $WS_2$, WC and WC fuse sinter coated with 1–20 wt.% Co. and mixtures thereof;

iii. an effective amount of bonding/nonwetting agent including at least polytetrafluoroethylene; and iv. an effective amount of a catalyst for oxygen reduction and decomposition of perhydroxides selected from the group consisting of silver, platinum and silver mercury alloy; and 2. a metal current collector molded into said composite to form a hydrophilic layer; and B. a hydrophobic layer laminated to said hydrophilic layer.

7. An air electrode as set forth in claim 6 wherein said oxygen absorption/reduction carbon black has an interlayer spacing between about 7.0 to 7.2A and the particles have a pore diameter between about 0.005–0.002 microns.

8. An air electrode as set forth in claim 6 wherein said oxygen absorption/reduction carbon consists essentially of an acetylene black having a total surface area of between about 30–450 sq. meters/gram, and is in a form wherein generally spherical particles are separated from each other and joined together in a three dimensional fashion by carbon-oxygen complexes which provide links between the separated carbon particles.

9. An air electrode as set forth in claim 6 wherein the current collector is a metal fiber current collector and the low oxygen overvoltage material is selected from the group consisting of $WS_2$, WC and WC fuse sinter coated with 1–20 wt.% Co.

10. An air electrode as set forth in claim 7 wherein said hydrophobic layer comprises a sheet of porous, plastic selected from the group consisting of polytetrafluoroethylene, polypropylene, fluorinated ethylene propylene and mixtures thereof.

11. An air electrode as set forth in claim 9 wherein said hydrophilic composite is substantially flat and includes 0.15–1.5 parts by weight of catalyst.

12. A metal/air cell comprising a metal electrode selected from the group consisting of iron, zinc, and cadmium; at least one air electrode as set forth in claim 9 spaced apart from said metal electrode; and an alkali hydroxide electrolyte in contact with said metal and air electrode.

13. A metal/air battery comprising a metal electrode selected from the group consisting of iron, zinc and cadmium; at least one electrode, effective to allow non destructive battery charging at between about 0.50–0.75 volts above a Hg/HgO reference electrode, spaced apart from said metal electrode, the electrode comprising:

A. A hydrophilic layer consisting essentially of 1. a hydrophilic composite comprising i. acetylene black carbon;

ii. a low oxygen over voltage material selected from the group consisting of $CuWO_4$, $NiWO_4$, $CoWO_4$, $WS_2$, WC and WC fuse sinter coated with 1–20 wt.% Co. and mixtures thereof;

iii. an effective amount of bonding/non-wetting agent including at least polytetrafluoroethylene; and iv. an effective amount of a catalyst for oxygen reduction and decomposition of perhydroxides selected from the group consisting of silver, platinum and silver mercury alloy; and 2. A metal current collector molded into said composite to form a substantially flat hydrophilic layer; and B. A hydrophobic layer laminated to said hydrophilic layer; and an alkali hydroxide electrolyte in contact with said metal electrode and the hydrophilic layer of said air electrode.

14. The metal/air battery as set forth in claim 13 wherein said hydrophilic composite includes about 0.5–4 parts by weight low oxygen overvoltage material for each part carbon, (iv) 0.15–1.5 parts by weight of catalyst, the acetylene black carbon is in a form wherein generally spherical particles are separated from each other and joined together in a three dimensional fashion by carbon-oxygen complexes which provide links between the separated carbon particles, said acetylene black carbon having a particle size range of between about 0.005–0.13 microns and a total surface area from about 30–300 sq. meters/gram and the low oxygen over voltage material is WC fuse sinter coated with 10–15 wt.% Co.

15. The metal/air battery as set forth in claim 13 wherein the low oxygen overvoltage material is selected from the group consisting of $WS_2$, WC and WC fuse sintered coated with 1–20 wt.% Co.

* * * * *